(12) United States Patent
Bertram et al.

(10) Patent No.: US 7,917,864 B2
(45) Date of Patent: *Mar. 29, 2011

(54) AUTOMATICALLY SCALING THE INFORMATION AND CONTROLS IN NAVIGATION TABS PER AVAILABLE WINDOW AREA

(75) Inventors: Randal L. Bertram, Raleigh, NC (US); David P. Johnson, Cary, NC (US); Karen R. Kluttz, Raleigh, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/954,564

(22) Filed: Dec. 12, 2007

(65) Prior Publication Data
US 2008/0092076 A1 Apr. 17, 2008

Related U.S. Application Data

(63) Continuation of application No. 10/777,242, filed on Feb. 12, 2004, now Pat. No. 7,360,168.

(51) Int. Cl.
*G06F 3/048* (2006.01)
(52) U.S. Cl. .................. 715/777; 715/815; 715/851
(58) Field of Classification Search .................. 715/777, 715/815, 851
See application file for complete search history.

(56) References Cited

U.S. PATENT DOCUMENTS

| | | | |
|---|---|---|---|
| 5,151,974 A | 9/1992 | Tani et al. | |
| 5,283,864 A | 2/1994 | Knowlton | |
| 5,604,861 A | 2/1997 | Douglas et al. | |
| 5,745,716 A | 4/1998 | Tchao et al. | |
| 5,889,522 A | 3/1999 | Chew et al. | |
| 6,037,941 A | 3/2000 | Goto | |
| 6,072,484 A | 6/2000 | Kuroda | |
| 6,166,736 A | 12/2000 | Hugh | |
| 6,433,801 B1 | 8/2002 | Moon et al. | |
| 7,082,576 B2 | 7/2006 | Shahine et al. | |
| 2003/0071849 A1 | 4/2003 | Ferri | |

OTHER PUBLICATIONS

Scannell, P. et al., "Window Hierarchy Compression", IBM Technical Disclosure Bulletin, No. 332, Dec. 1, 1991.

(Continued)

*Primary Examiner* — Adam M Queler
*Assistant Examiner* — Andrea N Long
(74) *Attorney, Agent, or Firm* — Kunzler Needham Massey & Thorpe

(57) ABSTRACT

A method in a data processing system for providing a user of the data processing system with control of a software object organized into a plurality of information levels including initially displaying a first display window having a first size. The first display window includes a first level tab navigation frame to allow the user interactive access to a first information level of the plurality of information levels. The first display window additionally includes a first window-sizing interface to allow the user interactive access to a second display window having a second size which includes a second level tab navigation frame to allow the user interactive access to a second information level of the plurality of information levels and to subsequently display the second display window in response to the user interacting with the first window-sizing interface.

18 Claims, 10 Drawing Sheets

OTHER PUBLICATIONS

Henshaw, SF. et al., "Minimized and Maximized Window Appearance and Behavior as Just Another Window", IBM Technical Disclosure Bulletin, vol. 36, No. 8, Aug. 1, 1993. Hooper, S. et al., "Real World Design in the Corporate Environment: Designing an Interface for th Technically Challenged", AMC Press, Apr. 13-18, 1996, pp. 489-495.

"Automatic Notebook Tab Dimension Algorithm", IBM Technical Disclosure Bulletin, vol. 38, No. 5, May 1995.

"Scroll Bar Indexing with Split Screen View Option", IBM Technical Disclosure Bulletin, vol. 37, No. 04A, Apr. 1994.

"Previous Button and Tab-Extensions for Accessing Hidden Windows", IBM Technical Disclosure Bulletin, vol. 37, No. 9, Sep. 1994.

AUTOMATICALLY SCALING THE INFORMATION AND CONTROLS IN NAVIGATION TABS PER AVAILABLE WINDOW AREA

RELATED APPLICATIONS

This application is a continuation application of U.S. patent application Ser. No. 10/777,242 filed Feb. 12, 2004, now U.S. Pat. No. 7,360,168, and claims the benefit of and priority to, that application.

FIELD OF INVENTION

The present invention generally relates to user interfaces of data processing systems. More particularly, the present invention relates to tab navigation frames in a user interface environment for a data processing system.

Navigation tab interfaces have become increasingly important to user interfaces as applications and systems continually provide an ever-increasing number of windows, panels, and frames for viewing on a display screen. Tabs to notebook-style panels allow the user to quickly change the panel that is displayed, while covering the previously displayed tabbed panel within the same display area. Often the tabs convey little information beyond the title of the associated panel. In a few cases the tabs present alert indicators, such as, for example, a red 'X' to indicate a field is missing or wrong on the underlying panel.

There is also a trend toward use of multiple frames within a panel. Multiple frames within a panel allow for denser and more varied display of information and controls within the user interfaces per the space displayed in the panel. This ever-increasing panel segmentation and density also extends to tabbed notebook-style panels.

Notebook-style panels are easily accessible with a small-access point for the tab, so that only a relatively small tab is constantly exposed as the footprint and selectable area to display the underlying panel. Notebook-style panels provide a way to quickly display another user interface panel, potentially, with multiple frames.

Notebook-style panels are a good alternative to providing a full size window with all its associated panels and frames simultaneously displayed. If all panels and frames associated with a full size window are displayed together simultaneously, the content may be too much to fit within some display screens. Additionally, the spread-out format of a full size window showing all the information in the panels and frames associated with the full size window make it difficult for a user to find the information of interest.

It is sometimes desirable for the user to focus solely on one user interface frame at a time. For this the user might want to quickly convert the frame (e.g., a monitoring portal) to full size to see more details and control options and then, when the user is done focusing on the full-size frame, quickly switch back to a smaller frame, which displays higher level information containing less detail. It is further desirable to scale the amount of status information and the level of controls within a tab navigation frame to provide more than the title or more than the title, small icon, and alert indicator.

SUMMARY OF THE INVENTION

In view of the above limitations of existing user tab navigation frames it is the object of the present invention to increase the information level available on the tabs in a tab navigation frame beyond title or title, small icon, and alert indicators. It is a further object of the present invention to increase information provided by the tab as the level of information available in the display window increases.

One form of the present invention is a method in a data processing system for providing a user of the data processing system with control of a software object, which is organized into a plurality of information levels. The data processing system initially displays a first display window having a first size. The first display window includes a tab navigation frame to allow the user interactive access to a first information level of the plurality of information levels. The first display window additionally includes a first window-sizing interface to allow the user interactive access to a second display window having a second size. The second display window includes a second level tab navigation frame to allow the user to have interactive access to a second information level of the plurality of information levels. The second display window is displayed in response to the user interacting with the first window-sizing element.

The forgoing form and other forms, objects and aspects as well as features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DESCRIPTION OF THE PREFERRED EMBODIMENT

The present invention will now be described more fully hereinafter with reference to the accompanying figures, in which preferred embodiments are shown. This invention may, however, be embodied in many different forms and should not be construed as limited to the embodiments set forth herein. Like number refer to like elements throughout.

Figure 1:
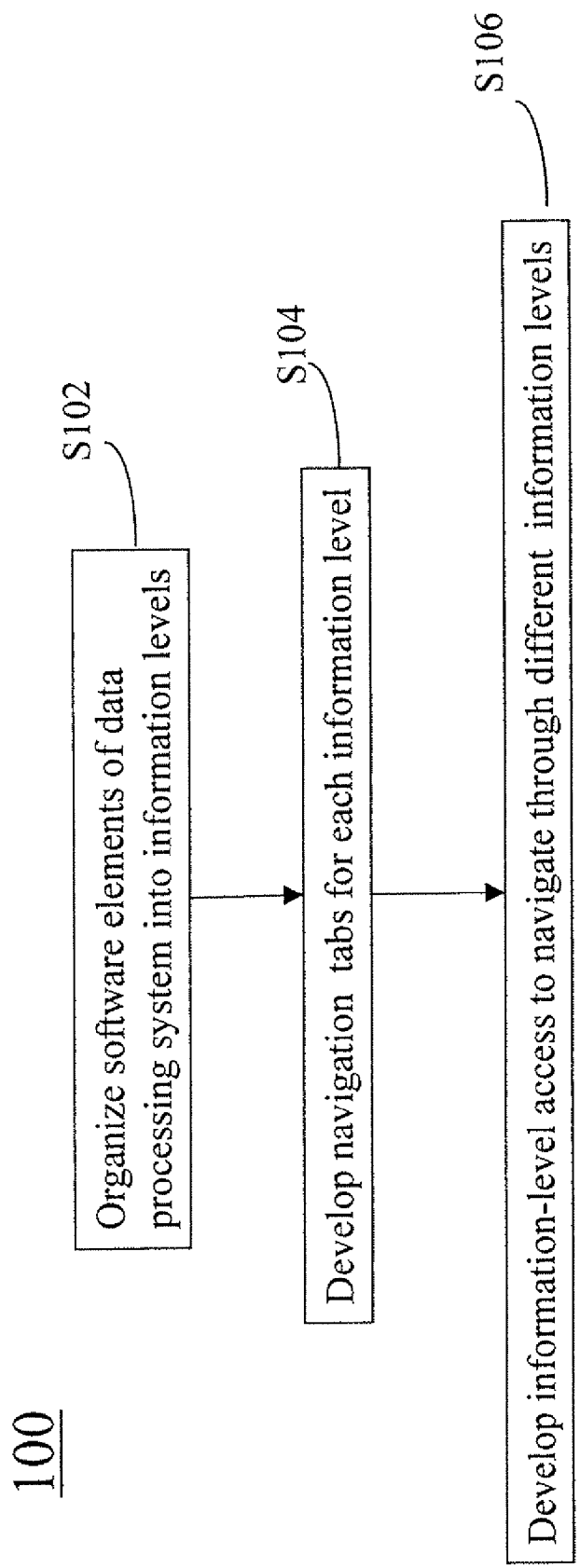
FIG. 1 illustrates a flow chart representative of method for developing a tab navigation interface and a window-sizing interface in accordance with a first embodiment of the present invention.

FIG. 1 is a flowchart 100 representative of a method for developing a tab navigation interface and a window-sizing interface in accordance with the present invention. During a stage S102 of flowchart 100, software elements in a data processing system are organized into information levels.

The information levels may differ in quantity of information. More is available for viewing by the user as the level of information, and the corresponding display size, increases. For example, if a failure is displayed as a software element in the first level of information, then the equipment experiencing the failure and the time of the failure will be displayed as a software element in the second level of information. In the third level of information, the type of failure is displayed along with the time and equipment experiencing the failure is displayed as a software element. In the fourth level of information the software element includes the type of failure, the equipment experiencing the failure, the time of failure and an appropriate action to be taken by the user viewing the display.

A software element may be a table with rows of tracked events and columns of parameters. The tracked events can include monitored functions of physical parameters, alerts, failures, etc. The parameters may include the name of the component, equipment or device, the description of events, time of event, description of a desired responsive action and physical data such as temperature, time, intensity of light, flow rate, pressure. When the software elements are organized into information levels, the critical parameters will be at the first level of information and the critical tracked events, such as, for example, failure, will be in the first level of information. If a table software element has 20 rows and 15 columns the first level of information may be a table with 3 rows and 4 columns. The second level of information will include the information in the first level but additional information will be included so the second level of information may be a table with 10 rows and 7 columns. The top level of information, such as a fourth level of information may include the complete table with 20 rows and 15 columns.

During stage S104 of flowchart 100, navigation tabs are developed for each information level. Tabs in a tab navigation frame must include a portion of the name of the corresponding display area at a first level of information. At a second level of information, the whole name and a corresponding icon may be in the tabs. At a third level of information, a first level software object, which would be viewed in the corresponding display area in the first level of information, such as a truncated table, may be in the navigation tabs. At a fourth level of information, a second level software object, which would be viewed in the corresponding display area in the second level of information, may be in the fourth level navigation tabs. Controls may also be present.

During a stage S106 of flowchart 100, information-level access is developed to navigate through the different information levels. The information available on each display corresponding to a tab will be correlated to the next higher level of tab. There are multiple tabs visible when one tab from a tab navigation frame is selected. If a user wants information from a display at the same level of information, the user selects one of the multiple tabs and another panel, having the same level of information, is displayed. If a user wants more information from a display the user selects a button in the window interface, which may be on a title bar at the top of the display window. The information will be updated as new input such as alerts, failures, or measured physical parameter data are received. The information available on each level of the correlated panel area or areas will be updated to reflect the additional input as it is received.

From the description herein of flowchart 100, those having ordinary skill in the art will appreciate the application of the present invention to any software element whereby the software element can be organized into an essentially limitless number of informational levels. The following description of FIGS. 2-7 herein details exemplary display windows derived from an implementation of flowchart 100.

Figure 2:
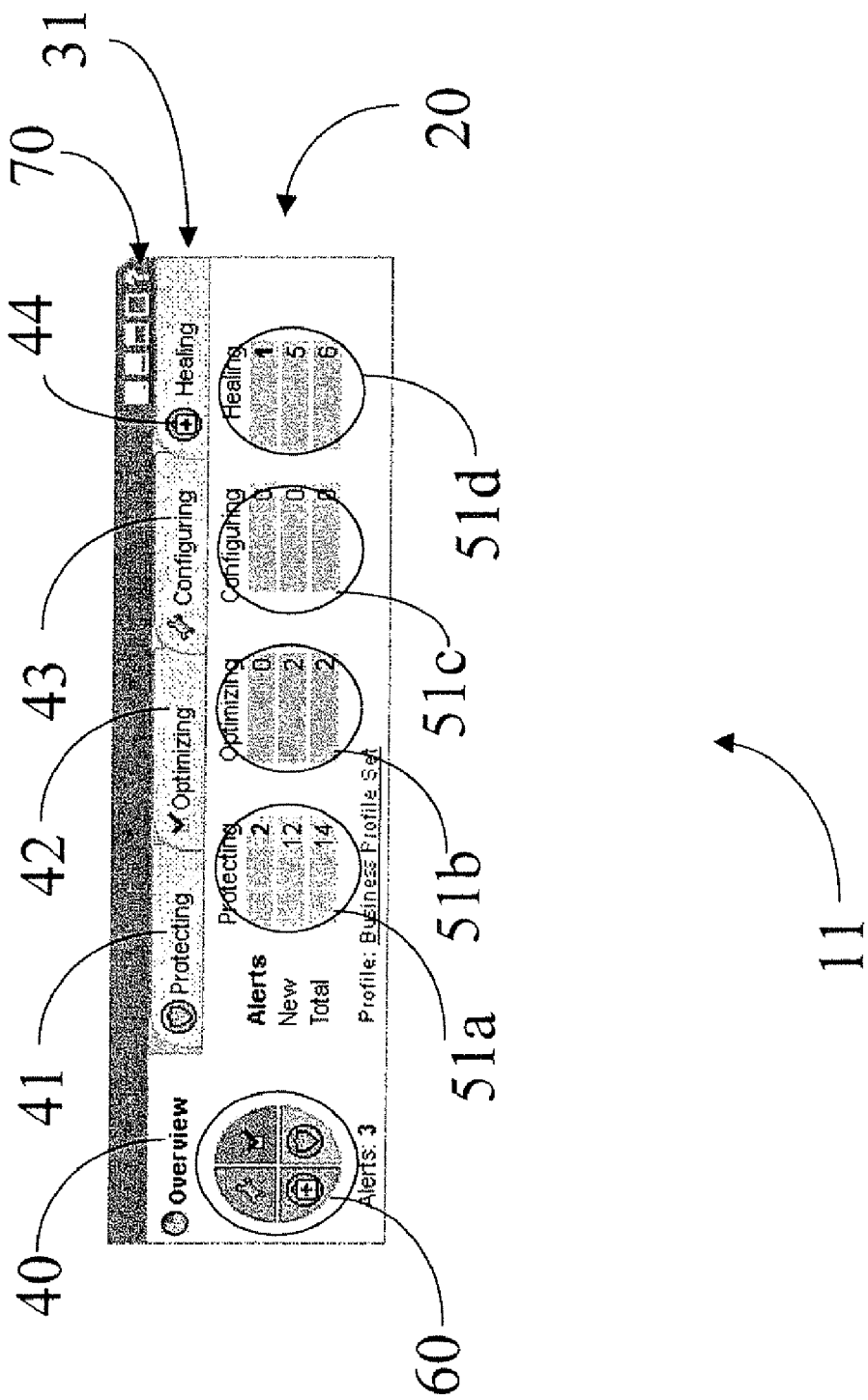
FIGS. 2-7 illustrates schematics of exemplary display windows in accordance with a second embodiment of the present invention.

FIG. 2 is a schematic of a first level display window 11 that provides access to a first level of information. First level display window 11 has a first size and includes panel area 20 which displays first level tab navigation frame 31 and frames 51a, 51b, 51c and 51d. The total number of alerts is displayed below the overview graphic 60.

A graphic is shown next to each of the tab titles within the tabs 40, 41, 42, 43 and 44 of first level tab navigation frame 31. In this exemplary tab navigation frame 31, the tab titles include 'Overview', 'Protecting', 'Optimizing', 'Configuring', and 'Healing'. The panel area 20 is showing for the case when the 'Overview' tab 40 is selected from the five possible tabs 40, 41, 42, 43 and 44. The protecting frame 51a, optimizing frame 51b, configuring frame 51c and healing frame 51d give a status overview of each tab category.

The various levels of information are accessed via window-sizing interface 70 that includes window resize buttons in a top bar. In this exemplary embodiment, the window resize buttons include four buttons to select from four levels of information. When a minimizing button, the far left button, is selected no information is displayed as the window is removed from the desktop and replaced with perhaps a small iconic representation in the operating system's status bar. The display after selecting this level of information may include a single icon, or tabs with only text labels, and is not illustrated. A user can select to view the first level display window 11 by touching a stylus to the button that is second from the left in the window-sizing interface 70. Alternatively, the user can select to view the first level display panel 11 by using a mouse to place a cursor over the small button that is second from the left in the window-sizing interface 70 and clicking on the mouse.

Figure 3:
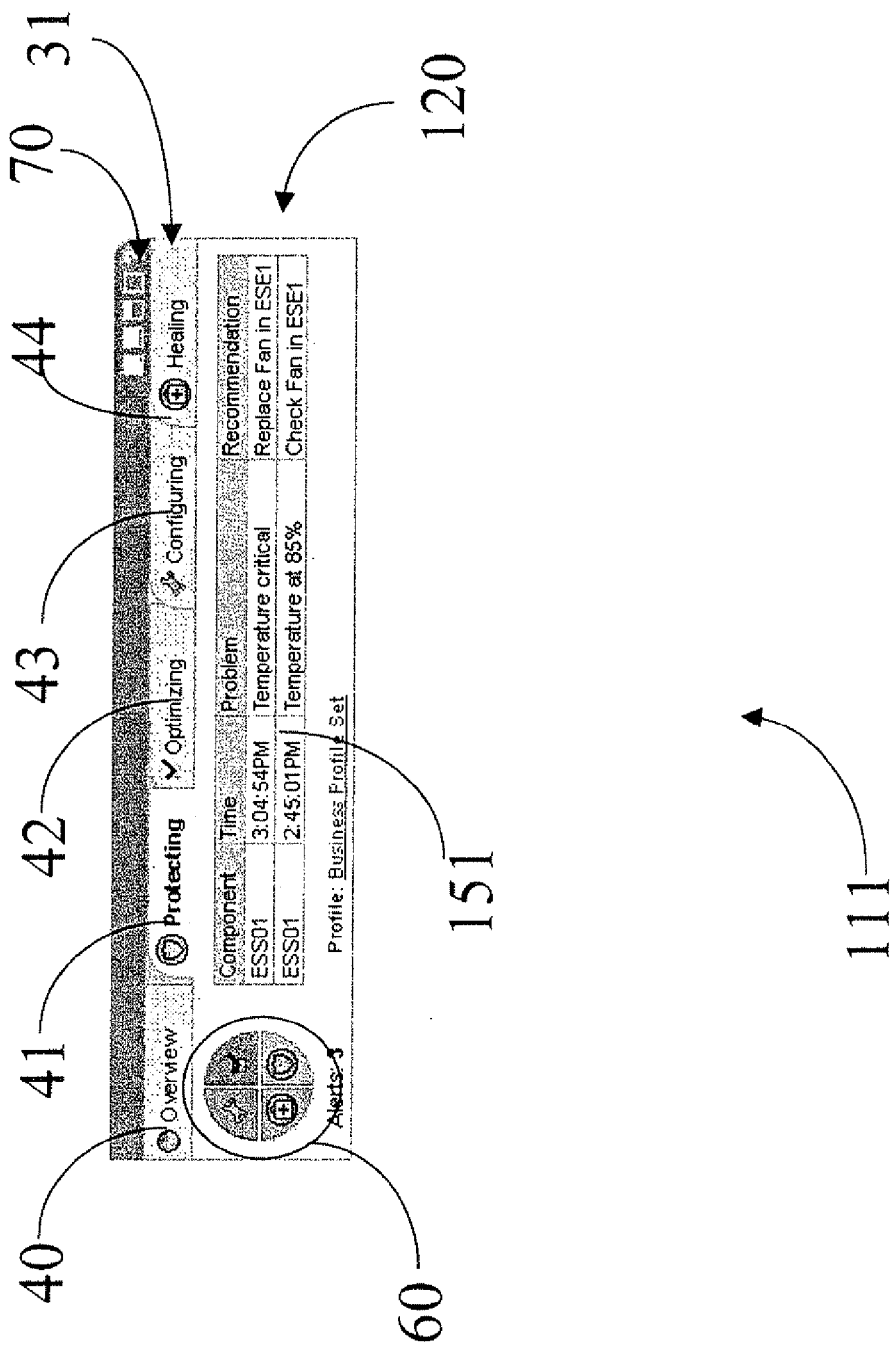

FIG. 3 illustrates a first level display window 111 which has the first size of first level display window 11 in FIG. 2. First level display window 111 includes a panel area 120 which displays first level tab navigation frame 31 and panel content frame 151. In FIG. 3 like elements share like reference numbers with FIG. 2. First level display window 111 provides access to a first level of information when the 'Protecting' tab 41 is selected. In this exemplary embodiment, the panel 120 displays a first level of information in a table or frame 151 outlining two problems in component ESS01. The times the problems occurred and recommended actions are also displayed in frame 151.

Figure 4:
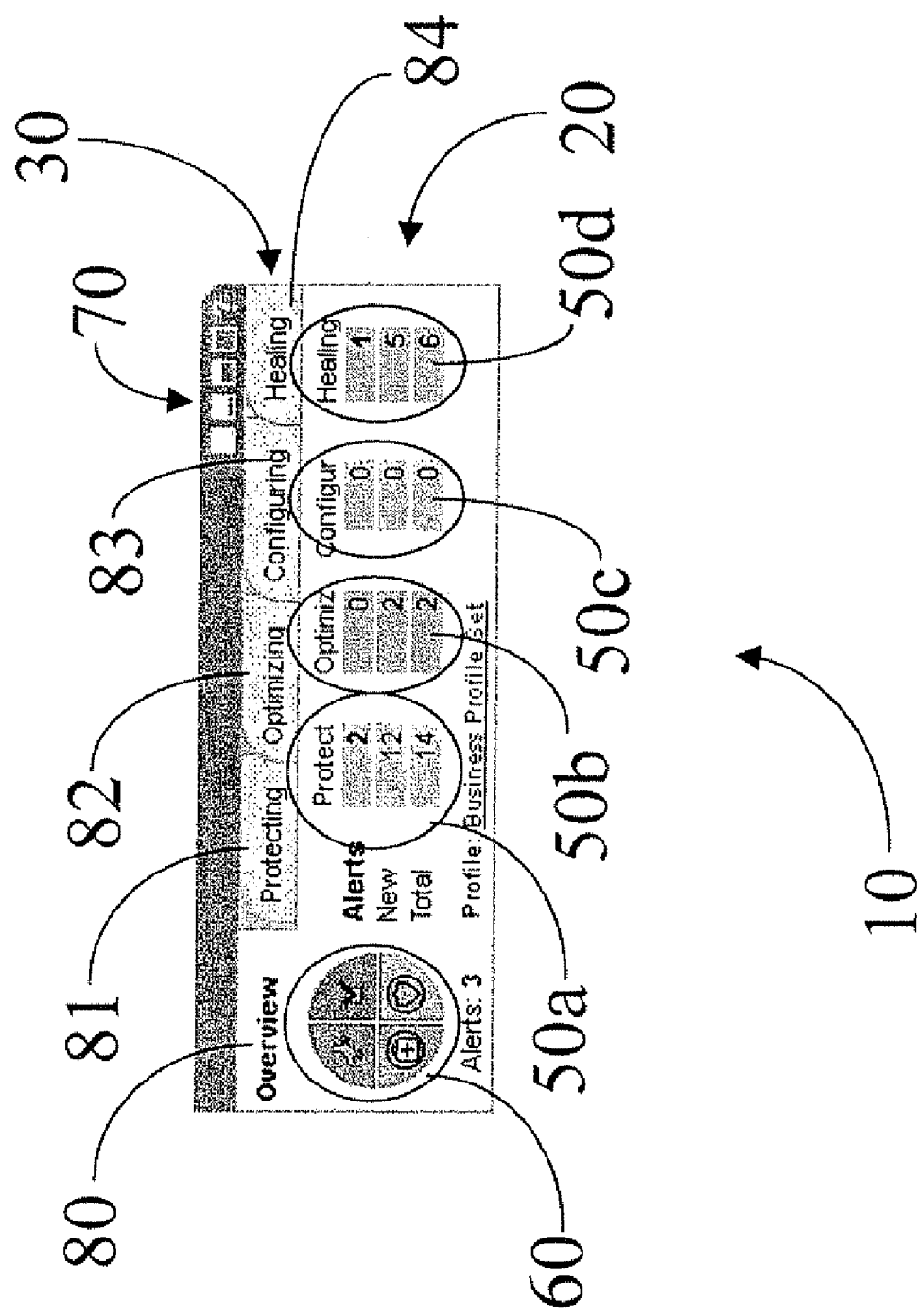

FIG. 4 is a schematic of a reduced size first level display window 10, in which the information displayed in first level display window 11 is reduced in size as the size of the first level display window is manually reduced in size. In FIG. 4 like elements share like reference numbers with FIG. 2. In one embodiment the reduced size first level display window 10, is obtained by using a mouse to place a cursor over the lower right hand corner of first level display window 11 and dragging the lower right hand corner toward the upper left hand corner of display window 11. Panel area 20 now shows protecting frame 50a, optimizing frame 50b, configuring frame 50c and healing frame 50d, which are smaller than frames 51a, 51b, 51c and 51d, respectively, in FIG. 1. Specifically, in this example, the title for each of frames 50a, 50b, 50c and 50d has been truncated and the status table dimension is narrower. The tabs 80, 81, 82, 83 and 84 that comprise the reduced level tab navigation frame 30, do not have the small graphic icon that was shown next to each of the tab titles in tab navigation frame 31.

Figure 5:
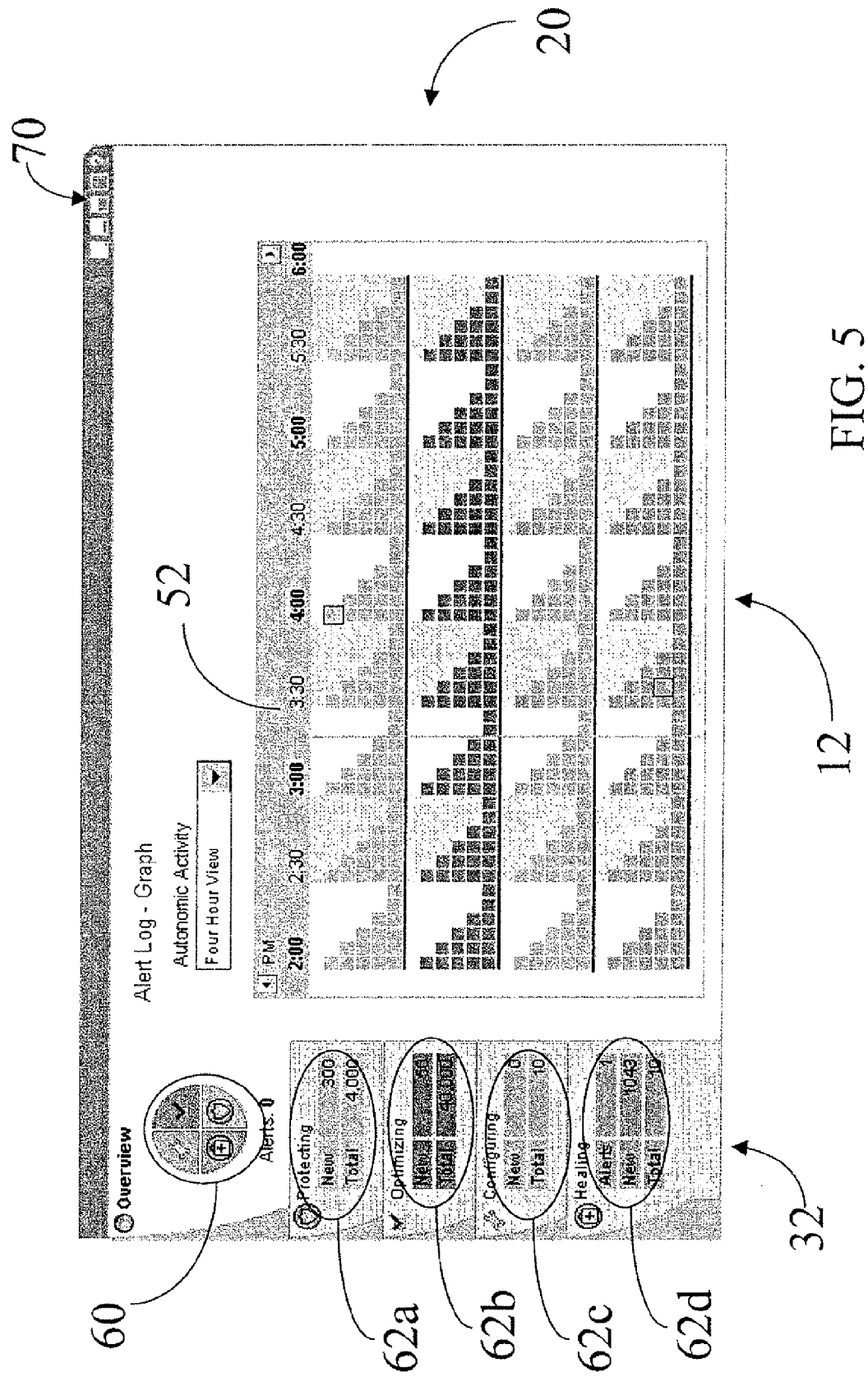

FIG. 5 is a schematic of a second level display window 12 that provides access to a second level of information and the 'Overview' tab is selected for display. In FIG. 5 like elements share like reference numbers with FIG. 1. The second level display window 12 has a second size which is larger than the first size of the first level display window. A user can display this screen by touching a stylus to the button that is third from the left in the window-resizing interface 70. Alternatively, the user can select to view the second level display window 12 by using a mouse to place a cursor over the small panel box that is third from the left in the window-resizing interface 70 and clicking on the mouse. Alternatively, the user can also manually adjust the window to be in this state and size by dragging the window border sides or corners.

The second level tab navigation frame 32 is at a higher information level than first level tab navigation frame 31 and therefore second level tab navigation frame 32 displays more information than first level tab navigation frame 31. Specifically, when navigation tabs were developed for each information level as shown in stage S 104 of FIG. 1, data from the panel area 20 of the first level display window 11 was included in the second level tab navigation frame 32 of second level display window 12. In this exemplary embodiment, the status frames 51 a, 5 lb, 51 c and 51 d seen in panel area 20 in FIG. 2 are now seen in frames 62*a*, 62*b*, 62*c* and 63*d*, respectively, of the second level tab navigation frame 32 of FIG. 5.

The second level tab navigation frame 32 is presented in vertical manner. The direction of tab presentation is automatically adjusted to best fit within the dimensions of the display windows 10, 11 or 12 as defined by predetermined optimal parameters. In this exemplary embodiment, as the information level within a second level tab navigation frame 32 exceeded the information level within first level tab navigation frame 31, the tab presentation was rotated from a horizontal presentation in first level display window 11 to a vertical presentation in a second level display window 12.

Panel area 20 is larger in FIG. 5 than in FIG. 2 and contains information that was not shown in panel area 20 of FIG. 2. Panel area 20 shows frame 52, which comprises a four-hour view for protecting, optimizing, configuring and healing activities. Thus, panel content frame 52 and tab navigation frame 32 display more detailed information than frames 51*a*, 51*b*, 51*c* and 51*d* and tab navigation frame 31.

Figure 6:
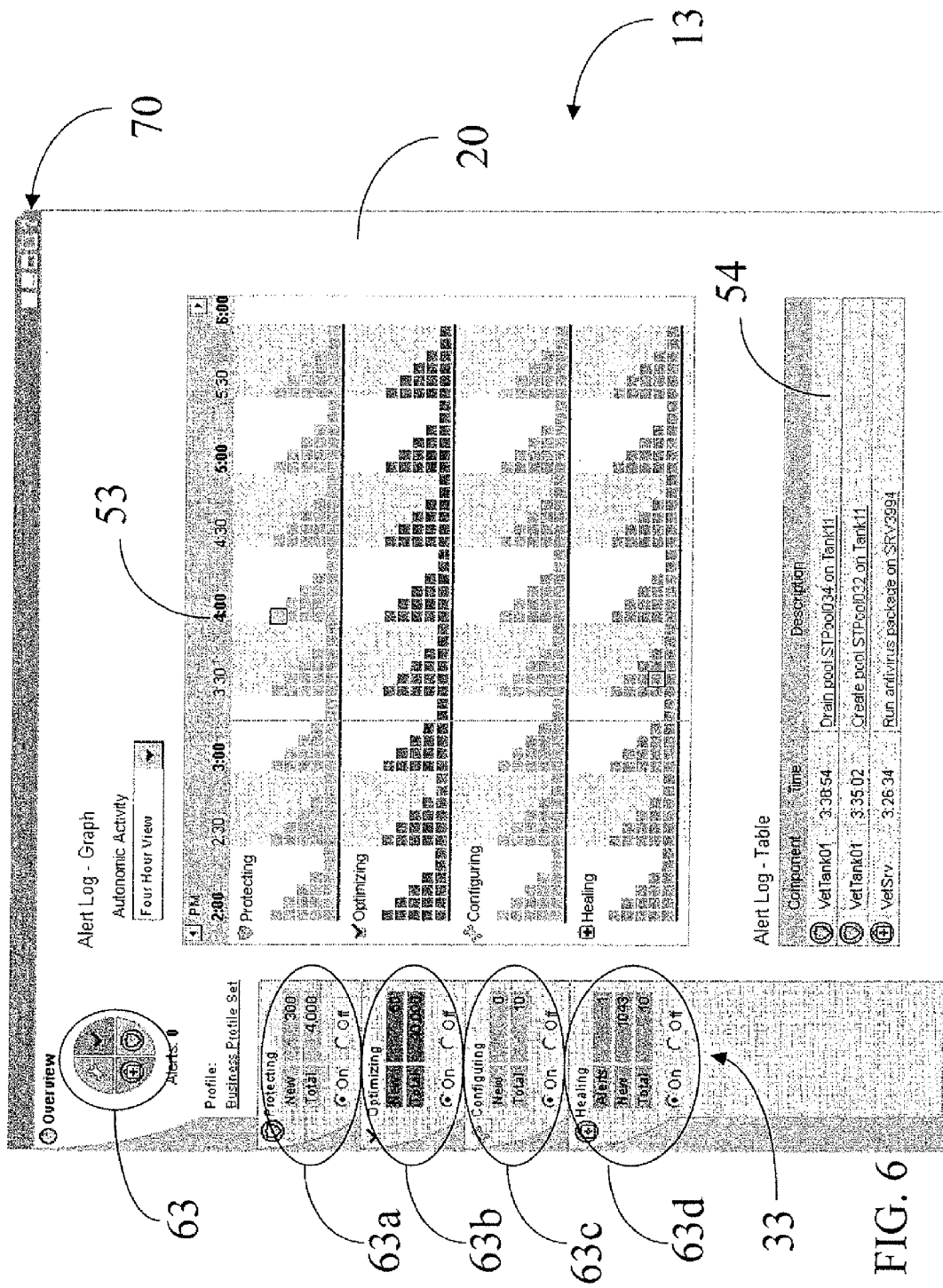

FIG. 6 is a schematic of a third level display window 13. In FIG. 6 like elements share like reference numbers with FIG. 1. The third level display window 13 has a third size which is larger than the second size of the second level display window. A user can display this window by touching a stylus to the button adjacent to the question mark in the window-resizing interface 70. Alternatively, the user can select to view the third level display window 13 by using a mouse to place a cursor over the maximizing display button in the window-resizing interface 70 and clicking on the mouse.

The third level tab navigation frame 33 is at a higher information level than second level tab navigation frame 32 and therefore third level tab navigation frame 33 displays more information than second level tab navigation frame 32. Specifically, when navigation tabs were developed for each information level as shown in stage S104 of FIG. 1, data from the panel area 20 of the second level display window 12 was included in the third level tab navigation frame 33 of third level display window 12. In this exemplary embodiment, the 'On' or 'Off' state of activities, that is, protecting, optimizing, configuring and healing activities, in FIG. 5 are now indicated by the selection of 'On' or 'Off' in On-Off controls in third level tab navigation frame 33 of FIG. 6.

Frame 52 of FIG. 5 is shown with an expanded level of information as frame 53 in panel area 20 of FIG. 6. The activity rows for protecting, optimizing, configuring, and healing are labeled with titles and icons in frame 53. An additional frame 54 is shown in panel area 20 of FIG. 6. Details about the three alerts indicated in FIGS. 2 and 5 are shown in the alert log table of frame 54. The alert log details in frame 54 include the names of components that experienced an alert, the time of the alerts and the description of the problem or action required.

Figure 7:
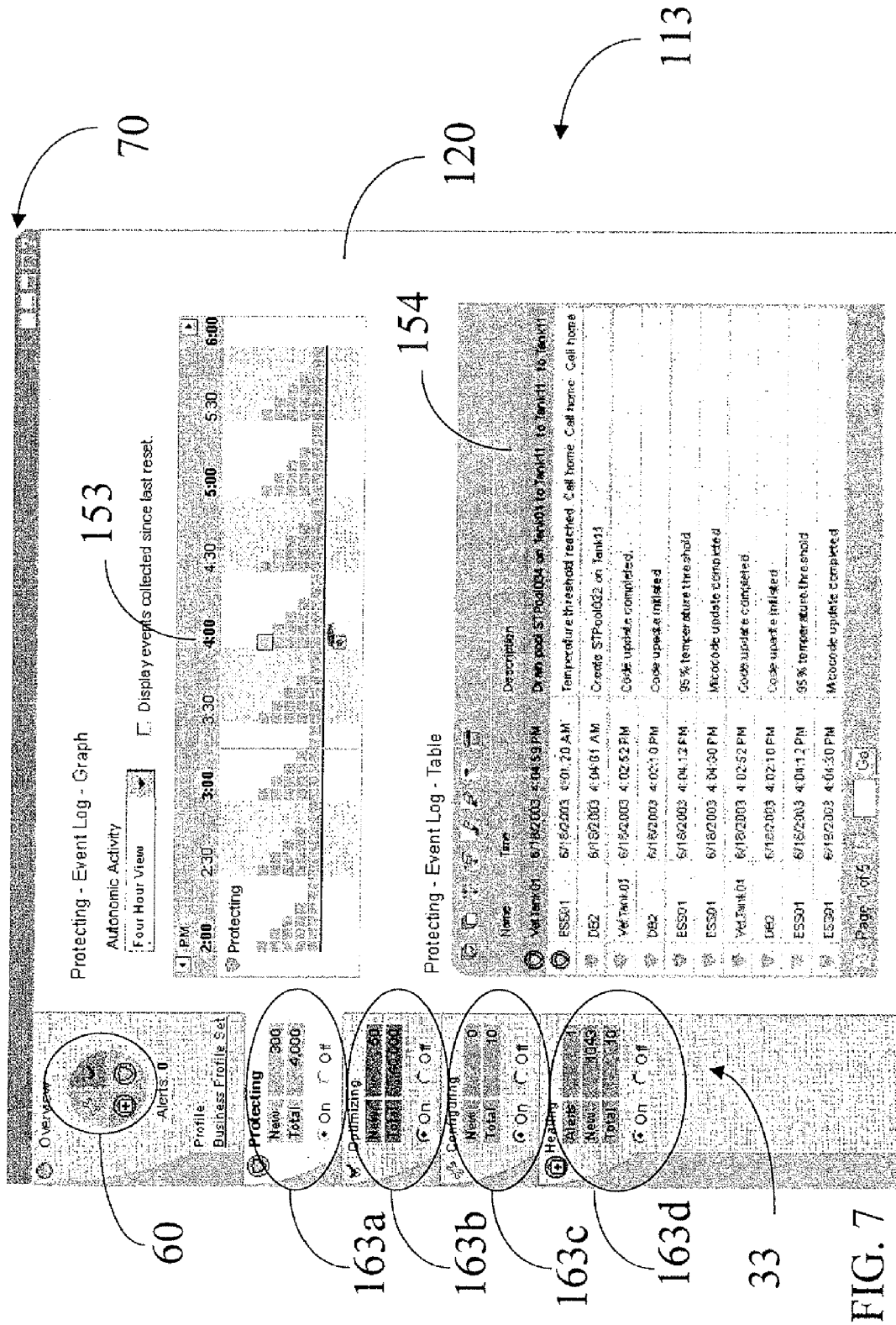

FIG. 7 is a schematic of a third level display window 113 that provides access to a third level of information when the 'Protection' tab is selected. In FIG. 7 like elements share like reference numbers with FIG. 6. Third level display window 113 has the third size of third level display window 13 in FIG. 6. Third level display window 113 comprises panel area 120 which displays third level tab navigation frame 33 panel content frames 153 and 154, and window-resizing interface 70. Frame 153 shows the protecting event log as a graph, which is one segment of the frame 53 in FIG. 6. Frame 154 shows in a table eleven events from various sources, times, and with corresponding descriptions. Frame 154 is an expanded version of frame 151, which was a software element displayed in the first level of information for the protecting tab shown in FIG. 3. The time each problem occurred and the recommended actions are also displayed in frame 154.

FIGS. 2 through 7 illustrate how navigation tab systems 30, 31, 32, 33, 133 include more information as the information level and the size of the display windows 10 through 13 increases, respectively.

Figure 8:
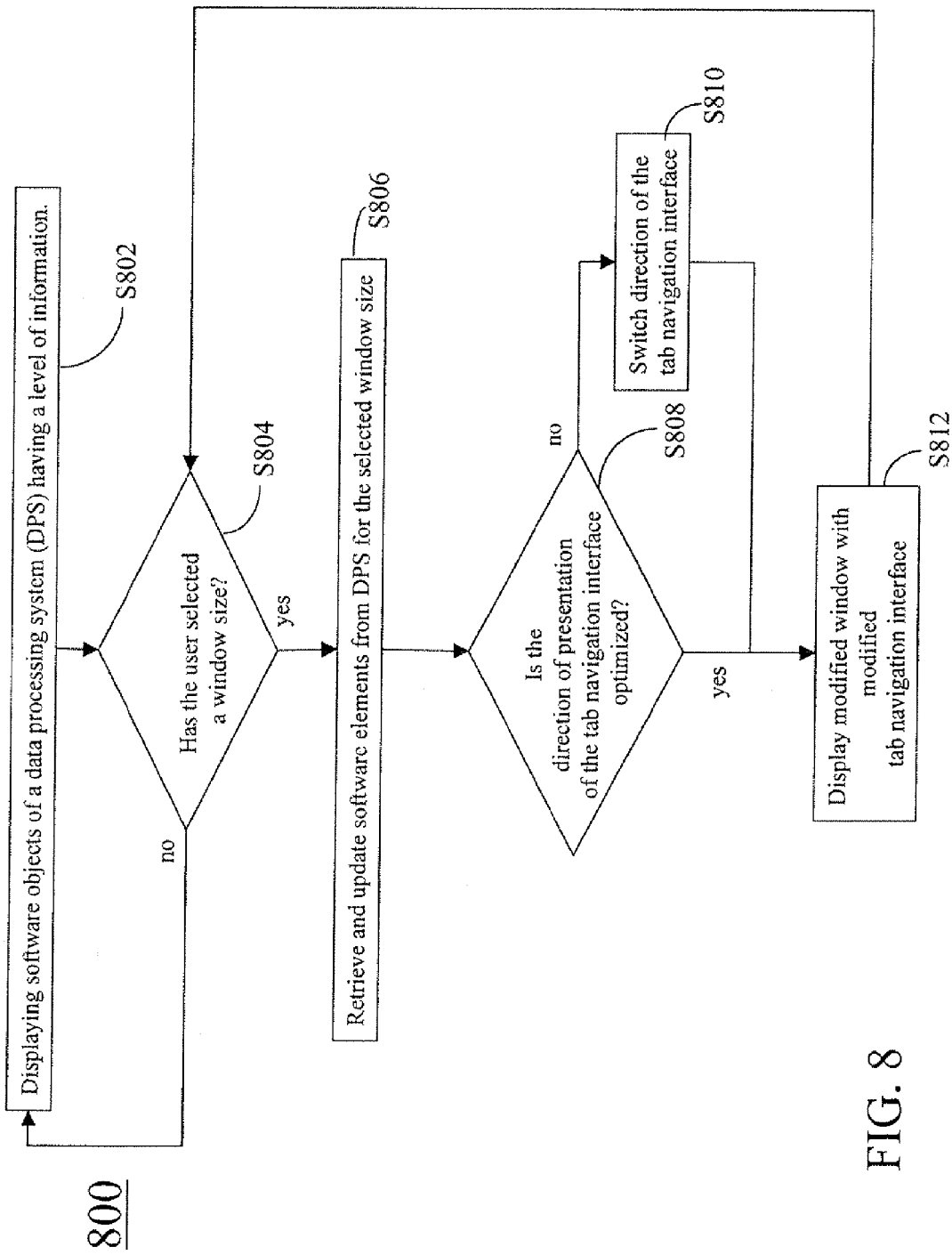
FIG. 8 illustrates a flowchart representative for a software control method in accordance with another embodiment of the present invention.

FIG. 8 illustrates a flowchart representative of one embodiment of a method for providing a user of a data processing system with control for viewing software objects, which are organized within the data processing system into a plurality of information levels. The following discussion of flowchart 800 is related to exemplary display windows 11 and 13 of FIGS. 2 and 6, respectively.

During a stage S802 of flowchart 800, software objects in a data processing system are displayed in a window having a level of information. In this exemplary flow, the window is the first level display window 11 of FIG. 2 which includes a window-resizing interface 70 having a plurality of window resize buttons. The first level display window 11 also includes a first tab navigation frame 31 having tabs 40-44 and frames 51*a-d*.

During a stage S804 of flowchart 800, it is determined if the user has selected a window size. If the user did not select a window size, the flow continues back to stage S802 during which the displaying of the display window having a level of information continues. If it is determined during stage S804 that the user has selected a window size, the flow proceeds to a stage S806.

The user can select a window size in a variety of ways. In one embodiment, the user selects a window size and the corresponding level of information to be displayed by using a mouse and cursor to select a window size button in the window-resizing interface 70. In an alternative embodiment, the user indicates the desire to display another display window by using a series of keystrokes on a keyboard to select a window size in the second window-sizing interface 70. In another embodiment, the user indicates the desire to display another display window by touching a window size button in the second panel interface 70 with a stylus. In yet another embodiment, the user drags and drops the window's edge or corner to resize the window.

During stage S806, the data processing system retrieves and updates the appropriate software elements for the selected window size and information level. In an exemplary case, if the user initially views first level display window 11 and selects to view third level display window 13, display tabs 63*a*, 63*b*, 63*c*, 63*d* for third level tab navigation frame 33 and data in frames 53 and 54 will be retrieved from memory of the data processing system. The retrieved data will be updated if additional recent data input has been received by the data processing system.

During a stage S808 of flowchart 800, it is determined if the direction of the presentation of the third level tab navigation frame is optimized to accommodate the changes to the information level within the third level display window 13. Algorithms will perform analysis in the data processing system to test for optimal presentation. In one embodiment, a display configuration having a smallest area passes the test for optimal presentation. In that embodiment, the algorithms evaluate multiple geometric configurations of the third level display window 13 for displaying frames 53 and 54 and frames 63a, 63b, 63c, 63d in third level tab navigation frame 33 to determine which configuration provides the smallest display size. In an alternative embodiment, a desired ratio of frames and a desired spacing between frames is defined and the algorithm evaluates various ratios and separation of frames 53 and 54 and frames 63a, 63b, 63c, 63d in third level tab navigation frame 33 within third level display window 13 to test for optimal presentation.

The direction of tab frame presentation may be in a vertical or horizontal manner. For example, display window 13 presents third level tab navigation frame 33 in a vertical manner with tab 63b below tab 63a and above tab 63c. First level display window 11 presents first level tab navigation frame 31 in a horizontal manner where tab 81 is to the left side of tab 82, while tab 83 is to the right of tab 82.

If it is determined by the data processing system algorithms that the direction of presentation is not optimized, during stage S808, the flow proceeds to a stage S810 of flowchart 800. During stage S810, the direction in which the third level tab navigation frame 33 is displayed is switched from horizontal to vertical or from vertical to horizontal. The flow then proceeds to stage S812.

If, during stage S808, it is determined by the data processing system algorithms that the direction of presentation is optimized, the data processing system will not switch the direction in which the tab navigation is displayed and the flow proceeds to a stage S812 of flowchart 800.

During stage S812, a window having a modified level of information is displayed. The retrieved and updated software elements, which are configured for an optimal presentation will be displayed in panel area 20. The flow then proceeds back to stage S804 where it is determined if the user has selected a new window size again. If it is determined that the user has selected a new window size again, the flow proceeds to stage S806. If user has not selected a new window size again, the flow continues back to stage S802 during which the displaying of the software object of data processing system having a level of information continues.

The user may select to maintain an information level and display a different panel by selecting a new tab. This was illustrated in moving from FIG. 6, where the overview panel was displayed in panel area 20 at a third level of information, to FIG. 7 where the protecting panel was displayed in panel area 120 at a third level of information.

Clearly, the illustrated schematics of display windows 10, 11, 12, 13, 111 and 113 (FIG. 2-FIG. 7) and the described flow in FIGS. 1 and 8 are meant to illustrate a way to modify the size of a displayed window 10, 11, 12, 13, 111 and 113 with a concurrent modification in the information level in the tab navigation frame 30-33. These illustrative schematics and the illustrated flow are not intended to be exhaustive of all possibilities or to limit what can be designed for the aforementioned purpose. By using what is shown and described herein, information level on a tab in a tab navigation frame increases as the size of the window increases.

Figure 9:
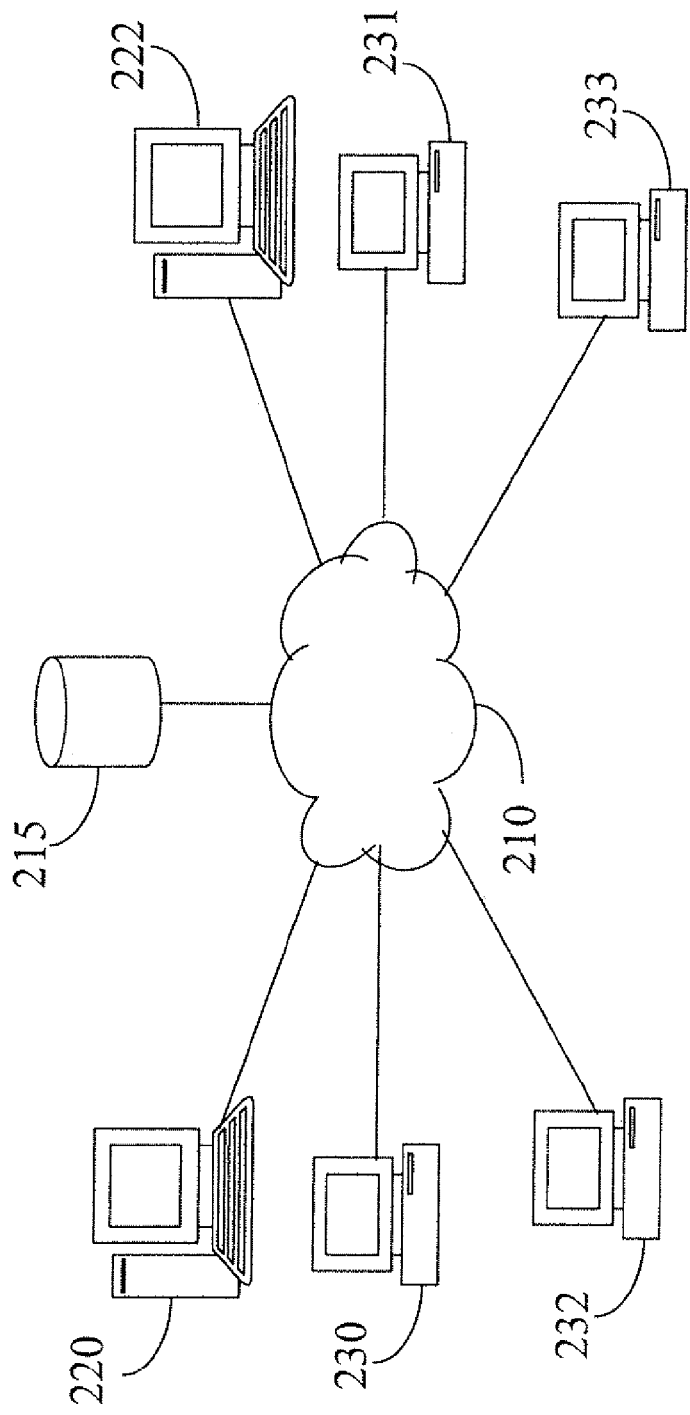
FIG. 9 is schematic diagram of a network of distributed data processing systems as known in the art for practicing the present invention.

With reference now to a practical implementation of the present invention, FIG. 9 depicts a network of data processing systems. Distributed data processing system 200 contains network 210, which is the media used to provide communications links between various devices and computers connected together within distributed data processing system 200. Network 210 may include permanent connections, such as wire or fiber optic cables, or temporary connections made through telephone or wireless communications.

In the depicted example, a server 220 and a server 222 are connected to Network 210 along with a database 215. In addition, a client 230, a client 231, a client 232, and a client 233 are connected to network 210. Servers 220 and 222, and clients 230-233 may be represented by a variety of computing devices, such as mainframes, personal computers, personal digital assistants (PDAs), etc. Distributed data processing system 200 may includes additional servers, clients, networks, routers, and other devices not shown.

Distributed data processing system 200 may include the Internet with Network 210 representing a worldwide collection of networks and gateways that use the TCP/IP suite of protocols to communicate with one another. Of course, distributed data processing system 200 may also include a number of different types of networks, such as, for example, an intranet, a local area network (LAN), or a wide area network (WAN).

The present invention could be implemented on a variety of hardware platforms. FIG. 9 is intended as an example of a heterogeneous computing environment and not as an architectural limitation for the present invention.

Figure 10:
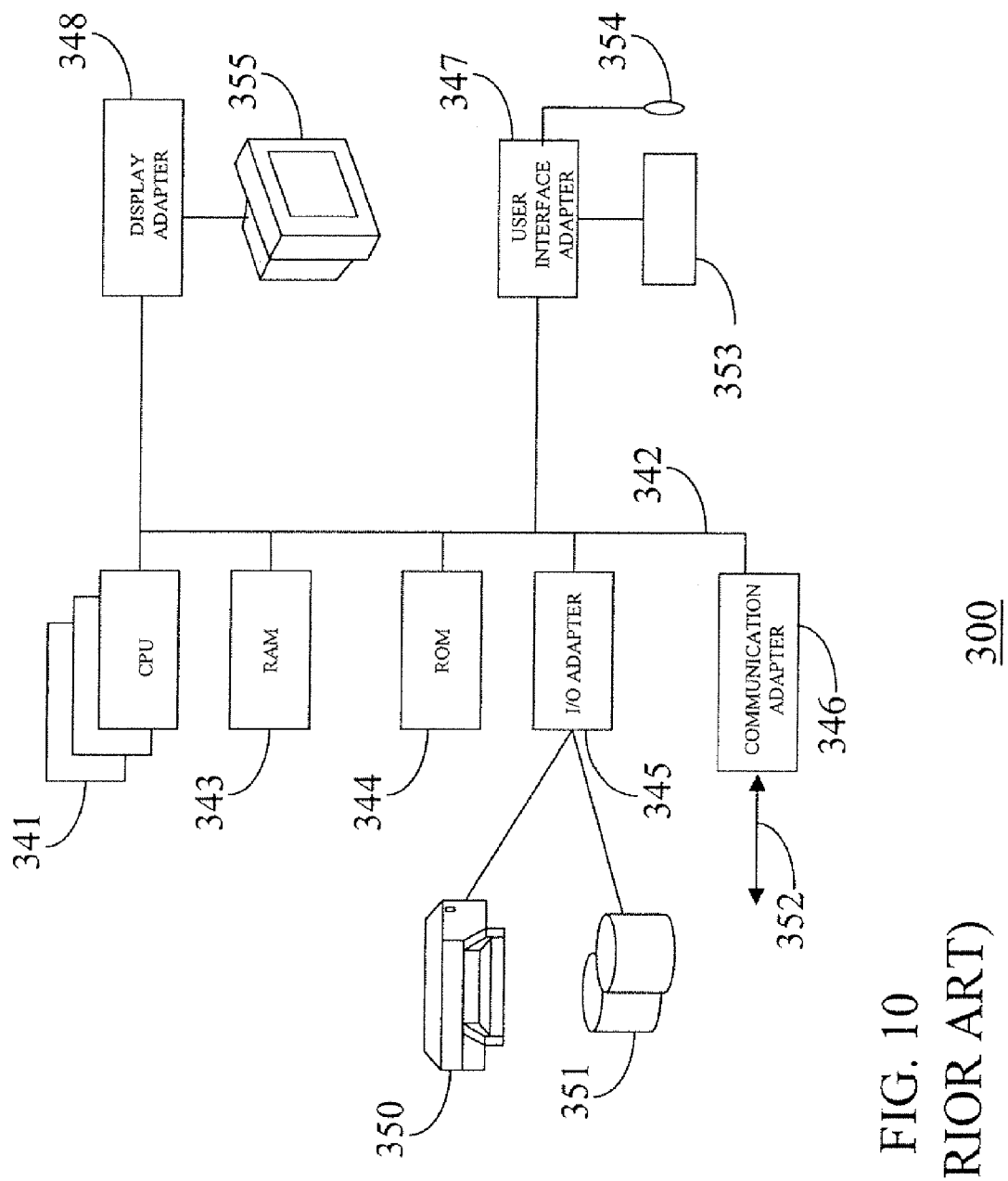
FIG. 10 is a schematic diagram of a computer architecture of a data processing system as known in the art for practicing the present invention.

With reference now to FIG. 10, a diagram depicts a typical computer architecture of a data processing system, such as those shown in FIG. 9, in which the present invention may be implemented. Data processing system 300 contains one or more central processing units (CPUs) 341 connected to internal system bus 342, which interconnects random access memory (RAM) 343, read-only memory (ROM) 344, and input/output adapter 345, which supports various I/O devices, such as printer 350, disk units 351, or other devices not shown, such as a sound system, etc. A communication adapter 346, a user interface adapter 347, and a display adapter 348 are also connected to bus 342. Communication adapter 346 provides bus 342 with access to a communication link 352. User interface adapter 347 connects bus 342 to various user input devices, such as keyboard 353 and mouse 354, or other devices not shown, such as a touch screen, stylus, etc. Display adapter 348 connects bus 342 to a display device 355.

Those of ordinary skill in the art will appreciate that the hardware in FIG. 10 may vary depending on the system implementation. For example, the system may have one or more processors, and other peripheral devices may be used in addition to or in place of the hardware depicted in FIG. 10. The depicted example is not meant to imply architectural limitations with respect to the present invention. In addition to being able to be implemented on a variety of hardware platforms, the present invention may be implemented in a variety of software environments, such as, for example, a programming of the present invention within or on a computer readable medium whereby a conventional operating system may be used to control program execution of the present invention within the data processing system. Those having ordinary skill in the art will appreciate various software languages that can be employed in writing software code for the various users interfaces of the present invention.

We claim:

1. A computer readable storage medium for providing a user of the data processing system with control of a software object organized into a plurality of information levels of varying amounts of information, the computer readable storage medium comprising:
   computer readable code for initially displaying a first display window having a first window size, wherein the first display window includes;
   a first level tab navigation frame for allowing the user interactive access to a first information level of the plurality of information levels, and
   a first window-sizing interface for allowing the user interactive access to a second window having a second window size,
   wherein the second display window includes a second level tab navigation frame for allowing the user interactive access to a second information level of the plurality of information levels;
   computer readable code for determining whether the direction of a presentation of the navigation frame is optimized to accommodate the changes to the information level within the display windows; and
   computer readable code for displaying the second display window subsequent to the initial display of the first display window in response to the user interacting with the first window-sizing element and based on whether the direction of the presentation is optimized.

2. The computer readable storage medium of claim 1, wherein the second display window further includes a second window-sizing interface for allowing the user interactive access to the first display window.

3. The computer readable storage medium of claim 2, further comprising:
   computer readable code for displaying the first display window subsequent to the display of the second display window in response to the user interacting with the second window-sizing interface to obtain access to the first display window.

4. The computer readable storage medium of claim 1, wherein the second display window further includes a second window-sizing interface for allowing the user interactive access to a third display window having a third window size; and
   wherein the third display window includes a third level tab navigation frame for allowing the user interactive access to a third information level of the plurality of information levels.

5. The computer readable storage medium of claim 4, further comprising:
   computer readable code for displaying the third display window subsequent to the display of the second display window in response to the user interacting with the second window-sizing interface to obtain access to the third display window.

6. The computer readable storage medium of claim 1, wherein the first level tab navigation frame includes a first tab content correlated to the first window size.

7. The computer readable storage medium of claim 6, wherein the first tab content includes at least one of icons, user interface elements of text, status information in graphs, status information in tables, status information in icons, controls and combinations therein.

8. The computer readable storage medium of claim 6, wherein the second level tab navigation frame includes a second tab content correlated to the second window size; and wherein the second tab content includes information displayed in the first display window.

9. The computer readable storage medium of claim 1, further comprising:
   computer readable code for orienting the display of the first display window relative to either a vertical axis or a horizontal axis as a function of the first window size.

10. A system for providing a user of the data processing system with control of a software object organized into a plurality of information levels of varying amounts of information, the system comprising:
    means for initially displaying a first display window having a first window size, wherein the first display window includes
    a first level tab navigation frame for allowing the user interactive access to a first information level of the plurality of information levels, and
    a first window-sizing interface for allowing the user interactive access to a second display window having a second window size,
    wherein the second display window includes a second level tab navigation frame for allowing the user interactive access to a second information level of the plurality of information levels;
    means for determining whether the direction of a presentation of the navigation frame is optimized to accommodate the changes to the information level within the display window; and
    means for displaying the second display window subsequent to the initial display of the first display window in response to the user interacting with the first window sizing element and based on whether the direction of the presentation is optimized.

11. The system of claim 10, wherein the second display window further includes a second window-sizing interface for allowing the user interactive access to the first display window.

12. The system of claim 11, further comprising:
    means for displaying the first display window subsequent to the display of the second display window in response to the user interacting with the second window-sizing interface to obtain access to the first display window.

13. The system of claim 10,
    wherein the second display window further includes a second window-sizing interface for allowing the user interactive access to a third display window having a third window size; and
    wherein the third display window includes a third level tab navigation frame for allowing the user interactive access to a third information level of the plurality of information levels.

14. The system of claim 13, further comprising:
    means for displaying the third display window subsequent to the display of the second display window in response to the user interacting with the second window-sizing interface to obtain access to the third display window.

15. The system of claim 10, wherein the first level tab navigation frame includes a first tab content correlated to the first window size.

16. The system of claim 15, wherein the first tab content includes at least one of icons, user interface elements of text, status information in graphs, status information in tables, status information in icons, controls and combinations therein.

17. The system of claim 15,
wherein the second level tab navigation frame includes a second tab content correlated to the second window size; and
wherein the second tab content includes information displayed in the first display window.

18. The system of claim 10, further comprising:
means for orienting the display of the first display window relative to either a vertical axis or a horizontal axis as a function of the first window size.

* * * * *